June 2, 1959     L. G. GINGER ET AL     2,889,363

PROCESS FOR PRODUCING THYROXINE

Filed Dec. 9, 1955     3 Sheets–Sheet 1

LEONARD G. GINGER
PAUL Z. ANTHONY
*INVENTORS*

BY *Jerome F. Fallon*

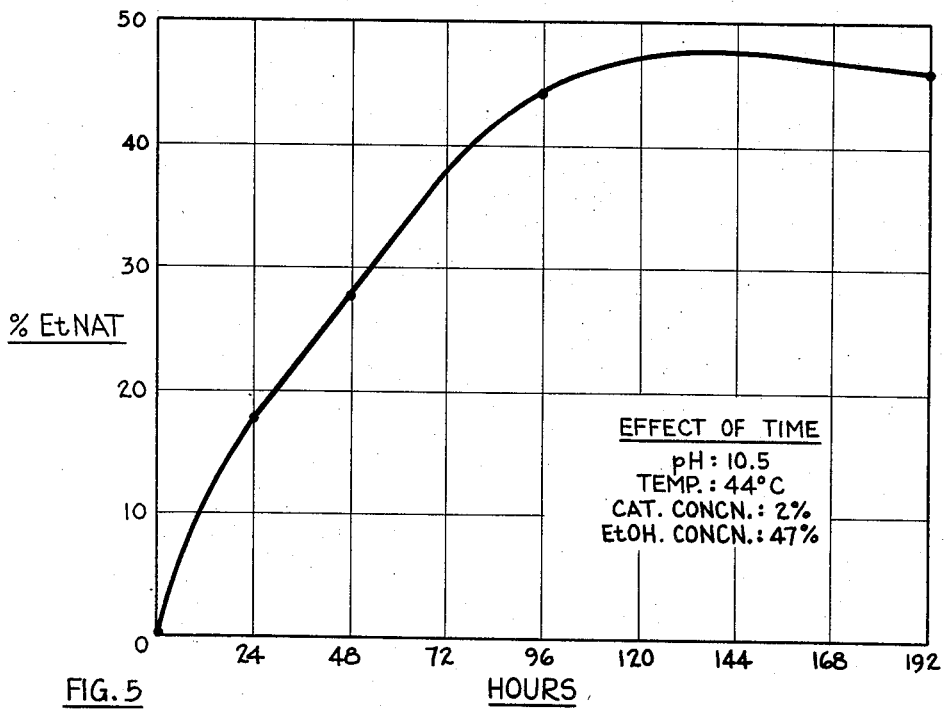

United States Patent Office 2,889,363
Patented June 2, 1959

2,889,363

PROCESS FOR PRODUCING THYROXINE

Leonard G. Ginger, Skokie, and Paul Z. Anthony, Morton Grove, Ill., assignors to Baxter Laboratories, Inc.

Application December 9, 1955, Serial No. 552,015

4 Claims. (Cl. 260—519)

This invention relates to a process for producing alkyl esters of N-acylthyroxine, and more particularly, to a process by which high yields of substantially pure, biologically-active L-thyroxine can be obtained from alkyl esters of N-acyldiiodotyrosine. The invention provides for the preparation of this important hormone which is used in treating such human ailments as myxedema, cretinism, obesity, etc., in such quantity as to supplement and perhaps eventually replace currently-used crude, biologically-variable desiccated thyroid tissue.

This invention is related to the commonly-assigned, co-pending application, Serial No. 517,794, filed June 24, 1955 (now Patent No. 2,803,654), in which the existing art in the so-called "digestive coupling reaction" (whereby diiodotyrosine yields thyroxine) was very substantially improved by the incorporation of novel preparative steps. Although work in the art on the digestive coupling reaction has shown the incorporation of protective groupings on the amino group, there is no instance in which the additional incorporation of a protective alkyl ester grouping on the carboxyl group has been disclosed.

We have made the novel observation that blocking of the carboxyl group in the diiodotyrosine derivative by esterification with an alkanol provides for substantially increased yields in the digestive coupling reaction. This is in addition to a blocking of the amino group by an acyl substituent. For example, it was demonstrated in Serial No. 517,794 (now Patent No. 2,803,654), that when the diiodotyrosine derivative containing an acyl substituent, but no blocking group on the carboxyl group, is digested under optimal coupling conditions, the yield is improved over the prior art of approximately 3–4% to approximately 15–20% and at the same time this is achieved within a very substantially reduced period of time. The present invention provides the further unexpected finding that blocking of the carboxyl group by esterification with an alkanol in addition to the acyl blockade on the amino group, further improves the obtainable yield to a range of 40–50%. However, the optimal conditions for effecting this reaction so as to provide for maximal yield are substantially different than those governing the simple acylated derivative.

There is considerable confusion in this field concerning expression of yield. Many investigators have determined the percentage yield in the digestive coupling reaction by subtracting the amount of recoverable diiodotyrosine or a derivative thereof from the starting amount and have assumed that the difference represents the diiodotyrosine or derivative thereof capable of entering into the digestive coupling reaction. In actuality, the yield should be based on the initial amount of diiodotyrosine or derivative thereof employed. All yields specified in our invention described herein will be in terms of the latter manner of yield computation.

An object of the present invention is to provide a process for the production of esters of N-acylthyroxine in which the time period required is substantially reduced in comparison to prior art processes, at the same time producing a superior yield. A further object is to provide a process in which the digestive coupling reaction in which alkyl esters of N-acyldiiodotyrosine yield alkyl esters of N-acylthyroxine in a greatly reduced time through the use of novel and optimal catalyst concentration, pH range and alcohol concentration. A still further object is to provide an improved process for the preparation of thyroxine from alkyl esters of N-acyldiiodotyrosine through a novel combination of steps, greatly increasing the yield within a minimum period of time. Other specific objects and advantages will appear as the specification proceeds.

Certain phases of the invention are illustrated in the accompanying drawings in which:

Figure 5 is a graph indicating by a curve the percent yield of ethyl ester of N-acetylthyroxine under different reaction times.

Figure 1:
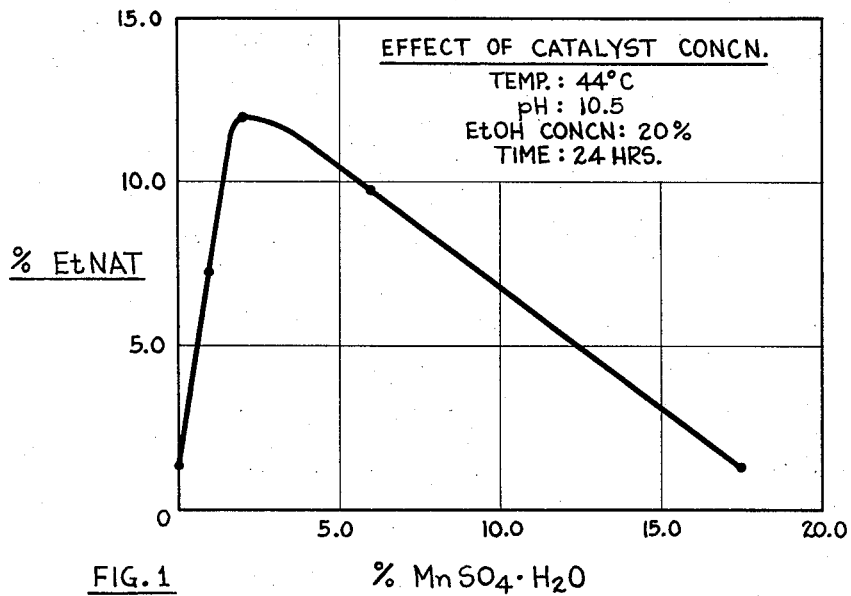
Figure 1 is a graph showing by a curve the percent of yield of ethyl ester of N-acetylthyroxine (EtNAT) under different catalyst concentrations.

In one embodiment of our invention, an alkyl ester of N-acyldiiodotyrosine is suspended in a boric acid solution containing 20% to 60% ethanol and the solid dissolved, preferably by adjusting the pH to about 8.7 to 11.6 with sodium hydroxide. Between 0.5 and 15% (by weight) of a catalyst, such as manganese sulfate, manganese oxide, or other salts of manganese, is added, and the solution heated to about 25 to 78° C. for a period of approximately 96 hours. After this period of time, the alkyl ester of N-acylthyroxine, which has precipitated, is collected. Subsequent acidic hydrolysis of this product of the digestive coupling reaction yields thyroxine.

The economic importance and other advantages of reducing the time period to approximately 96 hours, as realized by our process, are obvious. Further, the process described, in which optimal digestive coupling conditions are maintained, gives exceedingly high and consistent yields of 40–50%. Thus, the process affords a practicable method for the production of the pure, biologically-active hormone, thyroxine, in yields which are commercially feasible.

The digestive coupling step of our process can be expressed in terms of the following equation, wherein $R_1$ is an acyl radical and

represents an ester function:

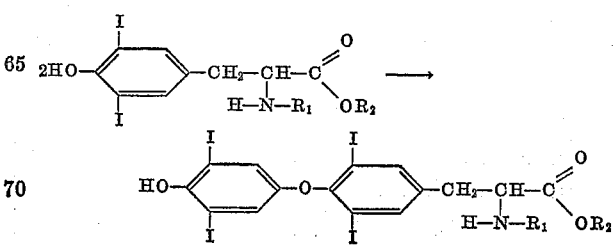

In the subsequent hydrolysis step, the acyl radical ($R_1$) and $R_2$ in the ester function are replaced by hydrogen.

The process of this invention provides an excellent method for the preparation of the optical isomers of thyroxine. When L-thyroxine is desired, the starting material is an ester of N-acyl-L-diiodotyrosine; when D-thyroxine is desired, the starting material is an ester of N-acyl-D-thyroxine; and, when DL-thyroxine is desired, the starting material is an ester of N-acyl-DL-thyroxine.

A substantial body of experiments was required to establish optimal conditions for the conduct of the digestive coupling reaction involving alkyl esters of N-acyldiiodotyrosine. In Table I are collected the experiments in which the digestive coupling reaction in a borate buffer solution containing ethanol at a concentration of 20% was carried out under conditions of oxygenation at a temperature of 44° C. and a pH of 10.5 to establish the effect of catalyst concentration on the course of the reaction.

TABLE I

*Effect of catalyst concentration*

| Experiment No. | Catalyst, Percent $MnSO_4 \cdot H_2O$ | Percent ethyl ester N-acetyl-thyroxine (at 24 hours) |
| --- | --- | --- |
| 1 | 0 | 1.3 |
| 2 | 1 | 7.2 |
| 3 | 2 | 12.0 |
| 4 | 6 | 9.8 |
| 5 | 17.5 | 1.2 |

In Table II are presented the experiments on the digestive coupling reaction involving the ethyl ester of N-acetyldiiodotyrosine carried out in a borate buffer solution containing ethanol at a concentration of 20%, at a temperature of 44° C. and an optimal catalyst concentration of 2% under conditions of oxygenation to establish the most effective pH range.

TABLE II

*Effect of pH variation*

| Experiment No. | pH | Percent ethyl ester N-acetyl-thyroxine (at 24 hours) |
| --- | --- | --- |
| 6 | 7.5 | 0.0 |
| 7 | 8.5 | 1.0 |
| 8 | 9.5 | 12.2 |
| 9 | 10.5 | 12.0 |
| 10 | 11.5 | 4.7 |

In Table III are presented the experiments involving the digestive coupling of the ethyl ester of N-acetyldiiodotyrosine in a borate buffer solution at a pH of 10.5 (within the optimal range) and a temperature of 44° C. and an optimal catalyst concentration of 2% under conditions of oxygenation to establish the effective working range of ethanol concentration.

TABLE III

*Effect of EtOH concentration*

| Experiment No. | Percent EtOH | Percent ethyl ester N-acetyl-thyroxine (at 24 hours) |
| --- | --- | --- |
| 11 | 0 | 9.5 |
| 12 | 20 | 12.0 |
| 13 | 35 | 19.8 |
| 14 | 47 | 17.7 |
| 15 | 64 | 12.1 |

Table IV is a summary of experiments involving the digestive coupling of the ethyl ester of N-acetyldiiodotyrosine in a borate buffer solution at a pH of 10.5, an ethanol concentration of 47%, a catalyst concentration of 2% and under conditions of oxygenation to establish the effective temperature range for the reaction.

TABLE IV

*Effect of temperature*

| Experiment No. | Temperature, ° C. | Percent ethyl ester N-acetyl-thyroxine (at 24 hours) |
| --- | --- | --- |
| 16 | 29 | 9.4 |
| 17 | 44 | 17.7 |
| 18 | 65 | 20.9 |
| 19 | 80 | 1.3 |

It was of importance to determine whether, under optimal coupling conditions, the superiority of oxygenation over aeration would persist. The yields illustrated in Table V show definitely that oxygenation gives superior results.

TABLE V

*Comparison of aeration and oxygenation*

| Experiment No. | Experimental conditions | Percent ethyl ester N-acetyl-thyroxine* |
| --- | --- | --- |
| 20 | Aeration | 12.5 |
| 21 | Oxygenation | 17.7 |

* 24 hours at 44° C., pH 10.5, ethanol concentration 47%, and catalyst concentration of 2%.

In Table VI are described the experiments involving the digestive coupling of the ethyl ester of N-acetyldiiodotyrosine in a borate buffer solution under the established optimal conditions relating to pH, catalyst concentration and ethanol concentration and at a temperature of 44° C. under conditions of oxygenation so as to appraise the time dependence of the reaction.

TABLE VI

*Effect of time*

| Experiment No. | Time, hours | Percent ethyl ester N-acetyl-thyroxine (at 24 hours) |
| --- | --- | --- |
| 22 | 24 | 17.7 |
| 23 | 48 | 27.4 |
| 24 | 96 | 44.7 |
| 25 | 192 | 46.0 |

It can be seen from Figure 1 and Table I that a maximum yield is obtained when the catalyst (manganese sulfate monohydrate) concentration is in the range of 0.5–15% (by weight). A preferable range for catalyst concentration is 1.5–5.0%. Catalyst concentration for the digestive coupling reaction involving the use of alkyl esters of N-acyldiiodotyrosine is obviously highly critical. This is in sharp contrast to our observations relating to the digestive coupling reaction involving N-acyldiiodotyrosine (Serial No. 517,794); now Patent No. 2,803,654 wherein a catalyst concentration of approximately equimolar amount is highly desirable and catalyst concentrations of up to 50% (by weight) are still efficacious. Such catalyst concentrations, if employed in the coupling reaction involving alkyl esters of N-acyldiiodotyrosine, would result in sharply decreased yields or virtually no yield of the desired product.

Figure 2:
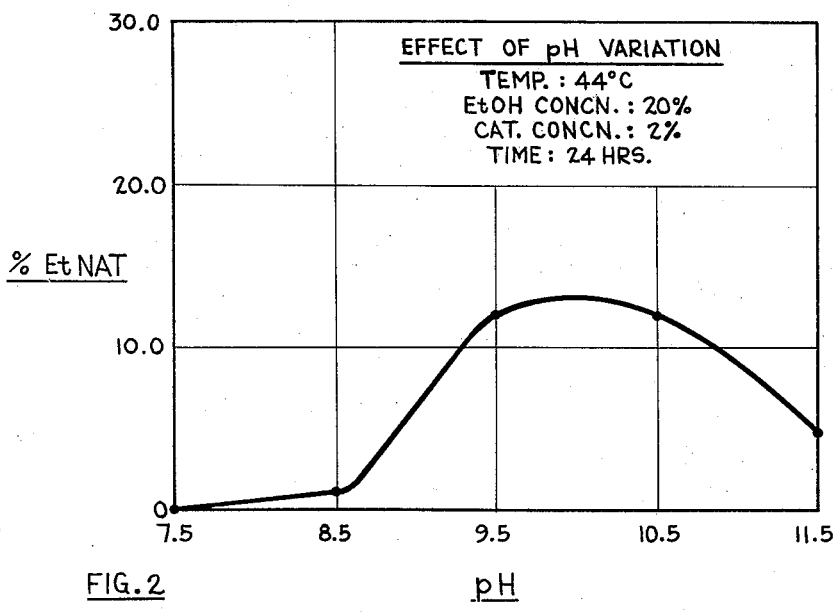
Figure 2 is a similar graph indicating by a curve the percent yield of ethyl ester of N-acetylthyroxine under different pH values.

In our process for obtaining alkyl esters of N-acyl-thyroxine and subsequently thyroxine itself, a novel and critical pH dependency was observed. Figure 2 and Table II disclose that a pH range of 8.7–11.6 is permissible but a preferred range of 9.5–10.5 results in maximal yield.

Figure 3:
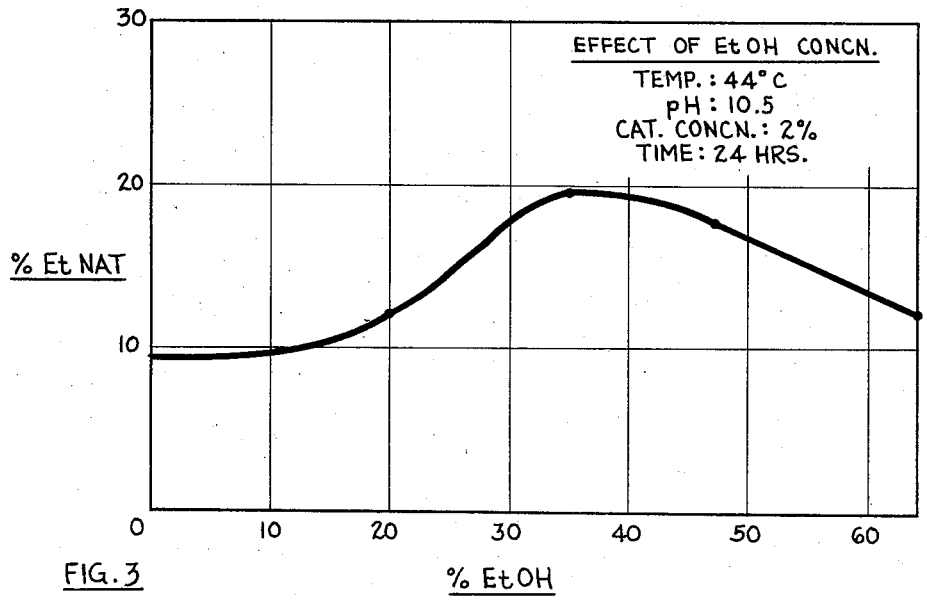
Figure 3 is a similar graph illustrating by a curve the percent yield of ethyl ester of N-acetylthyroxine under different ethanol concentrations.

We have also made the novel observation in the digestive coupling reaction involving alkyl esters of N-acyl-diiodotyrosine that ethanol concentration is critical in determining the course of the reaction. Figure 3 and Table III reveal that when the ethanol concentration is in the range of 20 to 60%, good yields can be obtained, but for maximal yields, it is necessary to operate in the ethanol concentration range of 28–48%.

Figure 4:
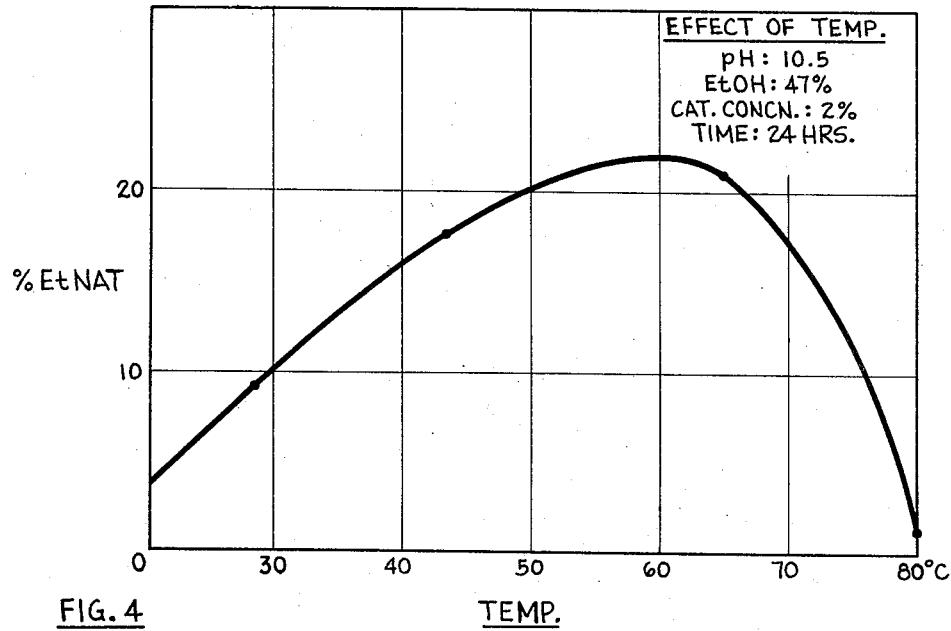
Figure 4 is a similar graph illustrating by a curve the percent yield of ethyl ester of N-acetylthyroxine under different temperature conditions.

A novel and critical dependency upon the temperature at which the digestive coupling reaction involving alkyl esters of N-acyldiiodotyrosine is carried out exists. We have observed, and this is apparent from Figure 4 and Table IV, that when the reaction temperature is in the range of 25 to 78° C., good yields can be obtained, but for maximal yields, it is necessary to operate within the temperature range of 40 to 73° C.

When all of these novel and unanticipated conditions are combined and the course of the reaction is extended for periods up to 192 hours, we have observed, and this is demonstrated in Figure 5 and Table VI, that good yields are obtained rapidly. For example, within 12 hours the yield is in excess of 10%. However, to attain maximal yields, it is essential to carry out the reaction for a period of approximately 96 hours, at which point the yield curve obviously reaches a plateau which is sustained for periods up to 192 hours. After this time, the obtainable yields begin to diminish, probably due to a secondary decomposition reaction.

In various experiments, using alkyl esters of N-acyldiiodotyrosine other than the ethyl ester of N-acetyldiiodotyrosine, we have found that excellent yields of the alkyl ester of the N-acylthyroxine are achieved when employing the optimal conditions described above. The specific acyl variants included were acetyl and butyryl and the alkyl ester variants were methyl and ethyl. In Table VII are summarized the results of such studies and the yields of alkyl ester of N-acylthyroxine obtained.

TABLE VII

Coupling of various alkyl esters of N-acyl derivatives [1]

| Experiment No. | Alkyl group | N-acyl group | Percent alkyl ester N-acylthyroxine (at 24 hours) |
| --- | --- | --- | --- |
| 26 | Methyl | Acetyl | 22.3 |
| 27 | Ethyl | do | 17.7 |
| 28 | do | Butyryl | 10.4 |

[1] At 44° C., pH 10.5, 2% MnSO$_4$.H$_2$O, and 47% ethanol with oxygenation.

Using our process, substantial modifications can be made in the nature of the N-acyl group. The function of this carboxylic acid radical is to remain firmly attached to the amino nitrogen atom during the incubation step so as to provide for the attainment of the superior yield, characteristic of our invention, in a substantially reduced time period in comparison with prior art processes. The substituent must also lend itself to hydrolytic removal subsequent to the incubation step. These demands are met by acyl groups derived, for example, from the straight-chain alkane carboxylic acids, branched-chain alkane carboxylic acids, cyclic alkane carboxylic acids, acids in these classes having substituents along the chain or on the ring, aromatic (including polycyclic and heterocyclic) carboxylic acids, aromatic (including polycyclic and heterocyclic) carboxylic acids having substituents on the ring(s), and carboxylic acids involving combinations of aliphatic, alicylic and aromatic (including polycyclic and heterocyclic) types.

The ester group serves a similar function during the incubation step, and it too must lend itself to hydrolytic removal subsequent to the incubation step. Substantial modifications can be made insofar as selection of the alcohol moiety for incorporation into the ester is concerned. The requirements are met, for example, by the straight-chain alkanols, branched-chain alkanols, alicyclic alcohols, alcohols in these classes having substituents along the chain or on the ring, phenolic compounds (including polycyclics and heterocyclics), phenolic compounds (including polycyclics and heterocyclics) having substituents on the ring(s), and alcohols involving combinations of aliphatic, alicyclic and aromatic (including polycyclic and heterocyclic) types.

Many epreximents incorporating the best conditions for the digestive coupling reaction wherein both the amino and carboxyl groups are blocked by an acyl substituent and esterification, respectively, have been conducted. As a result of these experiments, for the first time, a digestive coupling procedure is available which provides a practical method for attaining a yield within the range of 40–50% which is many times that obtainable previously. Further, this is attained within a relatively short time, thus making the procedure of significant commercial importance.

Specific examples of our process are set out as follows:

EXAMPLE 1

A 9.87 g. portion of the ethyl ester of N-acetyl-L-diiodotyrosine was suspended in 100 ml. of 0.05 M boric acid (H$_3$BO$_3$) and 100 ml. of 95% ethanol, and the solid was dissolved by adjusting the pH to 10.5 with 2 N sodium hydroxide (NaOH). A 2% (by weight) portion of manganese sulfate monohydrate was added and the solution heated at 44° C. under conditions of oxygenation while agitating mechanically. After approximately 96 hours of incubation, the precipitated product was collected and separated from the catalyst, providing the ethyl ester of N-acetyl-L-thyroxine in 44.7% yield. On hydrolysis (removal of acetyl and ester groups), achieved by refluxing in glacial acetic acid-hydrochloric acid (approximately 2:1), L-thyroxine was obtained. It was isolated as the sodium salt, containing approximately 5 molecules of water of hydration. Analysis of a representative material gave the following values: moisture, 8.58%; specific rotation, —5.3°; iodine, 62.2% (anhydrous); and nitrogen, 1.66% (anhydrous).

EXAMPLE 2

A 9.60 g. portion of the methyl ester of N-acetyl-L-diiodotyrosine was suspended in 100 ml. of 0.05 M boric acid (H$_3$BO$_3$) and 100 ml. of 95% ethanol, and the solid was dissolved by adjusting the pH to 10.5 with 2 N sodium hydroxide (NaOH). A 2% (by weight portion of manganese sulfate monohydrate was added and the solution heated at 44° C. under conditions of oxygenation while agitating mechanically. After approximately 24 hours of incubation, the precipitated product was collected and separated from the catalyst, providing the methyl ester of N-acetyl-L-thyroxine in 22.3% yield. On hydrolysis (removal of acetyl and ester groups), achieved by refluxing in glacial acetic acid-hydrochloric acid (approximately 2:1), L-thyroxine was obtained. It was isolated as the sodium salt, containing approximately 5 molecules of water of hydration.

EXAMPLE 3

A 10.42 g. portion of the ethyl ester of N-butyryl-L-diiodotyrosine was suspended in 100 ml. of 0.05 M boric acid (H$_3$BO$_3$) and 100 ml. of 95% ethanol, and the solid was dissolved by adjusting the pH to 10.5 with 2 N sodium hydroxide (NaOH). A 2% (by weight) portion of manganese sulfate monohydrate was added and the solution heated at 44° C. under conditions of oxygenation while agitating mechanically. After approximately 24 hours of incubation, the precipitated product was collected and separated from the catalyst, providing the ethyl ester of N-butyryl-L-thyroxine in 10.4% yield. On hydrolysis (removal of butyryl and ester groups), achieved by refluxing in glacial acetic acid-hydrochloric acid (approximately 2:1), L-thyroxine was obtained. It was isolated as the sodium salt, containing approximately 5 molecules of water of hydration.

While in the foregoing specification, we have set forth specific examples of the process in considerable detail for the purpose of illustrating embodiments of the invention, it will be understood that such details may be varied widely by those skilled in the art without departing from the spirit of our invention.

We claim:

1. A process for the production of thyroxine comprising the steps of incubating an alkyl ester of N-acyldiiodotyrosine derived from one of the lower alkanols and one of the lower alkanoic acids in an aqueous solution containing up to about 70% of ethanol and having a pH in the range of 9.5 to 10.5 in the presence of between about 1.5% and 5.0% by weight of a manganese-containing catalyst while passing substantially pure oxygen through the solution and while maintaining the temperature in the range of 25–78% C., and hydrolytically removing the acyl and ester substituents from the ester of N-acylthyroxine obtained in the said incubation step.

2. A process for the production of thyroxine comprising the steps of reacting an alkyl ester of N-acyldiiodotyrosine in an aqueous solution containing about 47% ethanol and having a pH in the range of about 10.5 in the presence of between 1.5% and 5% by weight of a manganese-containing catalyst while passing substantially pure oxygen through the solution and while maintaining the temperature at about 44° C., the said ester being one in which the alcohol portion is derived from one of the lower alkanols and the acyl portion of the N-acyldiiodotyrosine is derived from one of the lower alkanoic acids, and hydrolytically removing the acyl and alkoxy substituents from the ester of N-acylthyroxine obtained in the reaction.

3. In a process of producing thyroxine, the steps of blockading the amino group in the diiodotyrosine with an acyl radical derived from a lower alkanoic acid and the carboxyl group with a lower alkanol to provide an ester of N-acyldiiodotyrosine, incubating the said ester of N-acyldiiodotyrosine in an aqueous solution of a lower alkanol having a pH in the range 8.7 to 11.6 in the presence of between about 0.5% to about 15% of a manganese-containing catalyst while passing substantially pure oxygen through the solution and while maintaining the temperature in the range of 25° to 78° C., and thereafter hydrolytically cleaving the alkoxy and acyl substituents from the resultant ester of N-acylthyroxine.

4. In a process for the production of thyroxine, the steps of blockading the carboxy and amino groups of diiodotyrosine with an alkoxy radical and an acyl radical respectively, said radicals being derived from one of the lower alcohols and one of the lower alkanoic acids, incubating the resultant ester of N-acyldiiodotyrosine in an aqueous alkaline solution of a lower alkanol and in the presence of a manganese-containing catalyst while passing substantially pure oxygen through the solution, and thereafter replacing the alkoxy and acyl radicals of the resultant ester of N-acylthyroxine with an hydroxyl radical and hydrogen, respectively.

References Cited in the file of this patent

UNITED STATES PATENTS 2,803,654    Anthony et al. _____ Aug. 20, 1957

OTHER REFERENCES

Rivers: Chemical Abstracts, vol. 42. p. 4142 (1948).